Oct. 16, 1934.  W. H. PHILLIPS  1,977,351
VALVE
Filed Nov. 26, 1930   2 Sheets-Sheet 1
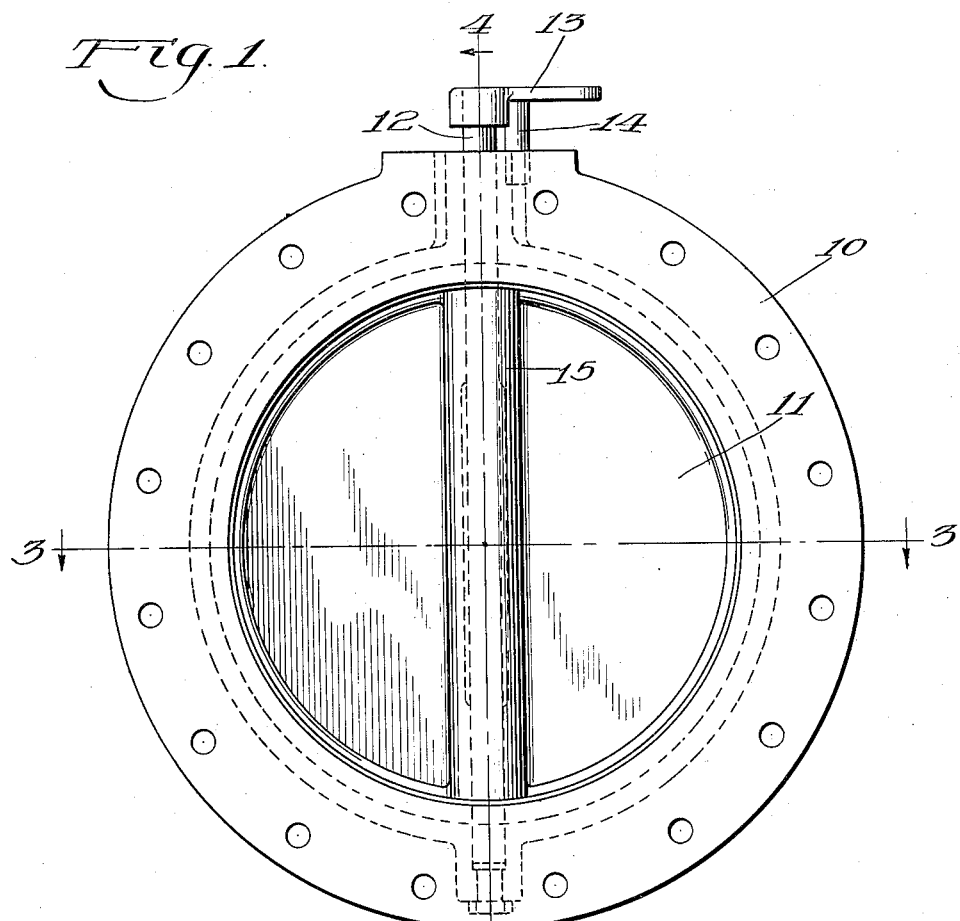
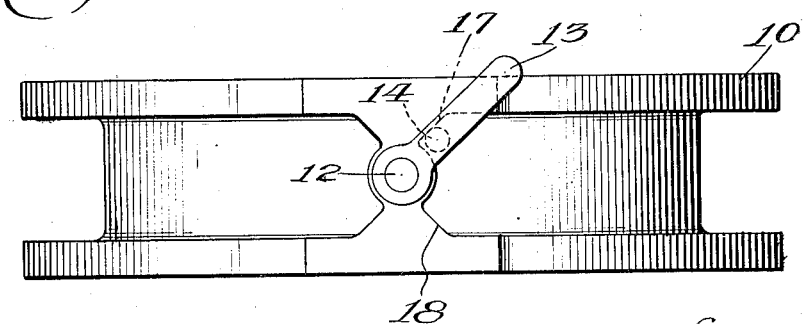

Oct. 16, 1934.　　　　W. H. PHILLIPS　　　　1,977,351
VALVE
Filed Nov. 26, 1930　　　2 Sheets-Sheet 2
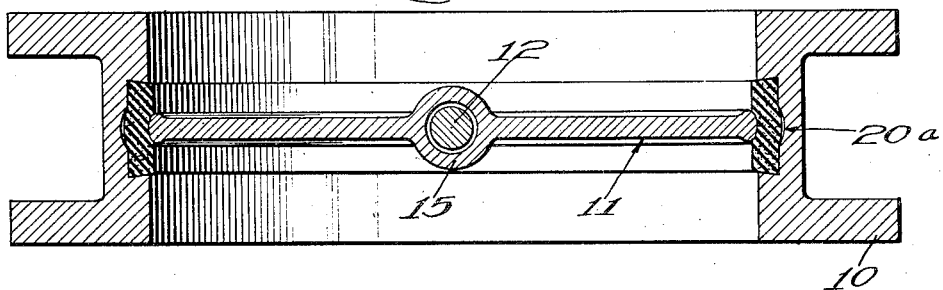
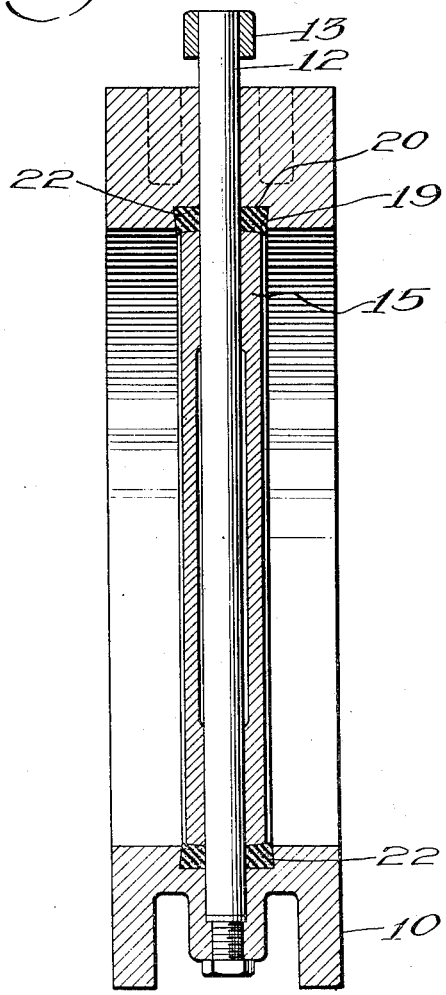
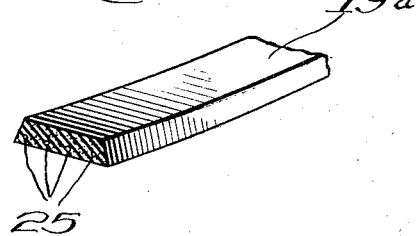
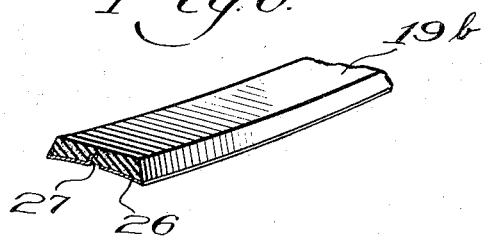
Inventor:
William H. Phillips,
By
Dyrenforth, Lee, Chritton & Wiles
Attys Patented Oct. 16, 1934

1,977,351

UNITED STATES PATENT OFFICE 1,977,351

VALVE

William H. Phillips, Oak Park, Ill., assignor to Henry Pratt Co., Chicago, Ill., a corporation of Illinois Application November 26, 1930, Serial No. 498,451

1 Claim. (Cl. 251—11)

The invention relates to valves, and particularly to valves of the butterfly type.

The primary object of the invention is to provide an improved valve for controlling the flow of air, powdered coal, ash, water, etc., under low pressures.

One form of the invention is embodied in a butterfly valve which comprises a pivoted metallic valve disk, the seat engaging surface of the disk being a portion of the surface of a sphere. The improved valve comprises a seat of resilient material, preferably rubber, the seat being an annular member inserted in an undercut groove provided in the body of the valve.

Other objects and advantages of the invention will become apparent as the following detailed description progresses, reference being had to the accompanying drawings, wherein:

Figure 1 is an end elevation of a valve which embodies the invention.

Fig. 2 is a plan view of the improved valve.

Fig. 3 is a section taken on line 3—3 of Fig. 1.

Fig. 4 is a section taken on line 4—4 of Fig. 1.

Fig. 5 is a fragmentary perspective view of a rubber seat which embodies another form of the invention, and Fig. 6 is a fragmentary perspective view of a seat which embodies still another form of the invention.

Referring for the present to Figs. 1 to 4, inclusive, wherein a preferred embodiment of the invention is illustrated, the reference character 10 designates, generally, the body or casing of the valve. Disposed within the casing 10 is a valve disk 11 which is secured to a valve stem 12 provided at its upper end with a handle 13. As best shown in Figs. 3 and 4, the valve disk 11 is provided with a boss 15 through which the stem 12 extends.

The valve disk 11 may be angularly displaced by means of the handle 13 which is preferably provided with a downwardly extending pin 16 which is engageable with stop surfaces 17 and 18 provided upon the casing 10. When the pin 16 engages the stop surface 17, the valve disk 11 is in its fully closed position and when the pin engages the stop surface 18, the valve disk is in its fully opened position.

The casing 10 is provided with a valve seat 19 which is an annular member formed from resilient material, preferably rubber. As shown in Figs. 3 and 4, the annular seat 19 has inclined side walls and is adapted to fit snugly in an undercut annular groove 20 provided in the casing 10. The annular seat 19 is provided with apertures 22 through which the valve stem 12 projects, the apertures being preferably smaller in diameter than the stem 12 so that the annular seat 19 fits tightly around the stem and functions as a packing member, as well as a seat.

The periphery of the valve disk 11 is preferably a portion of the surface of a sphere of the same diameter, this construction being employed so that the valve disk will not injure the valve seat when it is angularly displaced. The inside diameter of the seat 19 is preferably less than the diameter of the valve disk 11 so that the seat is compressed when the valve disk is in its closed position. This construction insures a fluid-tight joint when the valve disk is in its closed position.

In the preferred embodiment of the invention, a shallow annular groove 20a is formed in the bottom surface of the groove 20 so that the seat 19 may be flexed when the valve disk 11 is brought into its closed position. The groove 20a is preferably wider than the seat-engaging surface of the valve disk.

As indicated above, the annular seat 19 is preferably formed from rubber, but other yielding and resilient compounds may be employed. Thus, in some instances it may be desirable to employ rubber which has been loaded with asbestos.

The annular seat may be re-enforced if it is so desired. Thus, in Fig. 5 a portion of an annular seat 19a is shown, which seat is preferably formed from rubber and is provided with wires 25 embedded therein.

In Fig. 6, a portion of an annular seat 19b is shown, which seat 19b is provided with a metallic backing plate 26. Fingers 27 formed integral with the plate 26 project into the resilient portion of the seat 19b. The plate 26 is preferably arcuate in cross-section so that it can be inserted readily in the groove 20 and then flattened by exerting pressure thereon. When the plate 26 is flattened in this manner, the undercut surfaces of the groove 19 insure that the backing plate 26 with its resilient seat 19b will be fixed securely to the casing 10.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible, in view of the prior art.

What I claim as new, and desire to secure by Letters Patent, is:

A butterfly valve comprising a casing having a relatively large annular groove therein and a smaller annular groove in the bottom of the first mentioned groove, an annular valve seat formed in one piece from yielding material seated in and substantially filling the first mentioned annular groove, a valve stem, and a valve disk carried by said stem and engageable with said annular valve seat, said valve disk being larger in diameter than the inner diameter of said valve seat and being adapted to force said annular seat into said smaller annular groove when the valve disk is in its closed position.

WILLIAM H. PHILLIPS.